Patented June 26, 1951

2,558,400

UNITED STATES PATENT OFFICE 2,558,400

CYANINE DYESTUFF INTERMEDIATES AND PROCESS FOR MAKING SAME

Leo Arnold Van de Straete, Antwerp, Belgium, assignor to Gevaert Photo-Producten N. V., Mortsel-Antwerp, Belgium, a company of Belgium No Drawing. Original application June 13, 1947, Serial No. 754,605. Divided and this application January 16, 1948, Serial No. 2,819. In the Netherlands December 12, 1940

7 Claims. (Cl. 260—298)

The present invention relates to the manufacture of new organic compounds and particularly to the manufacture of organic compounds suitable as intermediates for dyestuffs which may be used as sensitizers for silver halide photographic emulsions.

It is an object of my invention to provide new organic compounds.

A further object of my invention is to provide a new process for preparing organic compounds.

Further objects will appear from the following description.

I have now found that suitable dyestuff intermediates of the formula

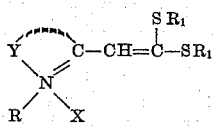

wherein

Y = the non-metallic atoms required for completing a five- or six-membered heterocyclic nucleus occasionally having a benzene or naphthalene nucleus fused on, R and $R_1$ = alkyl or substituted alkyl, X = an acid residue e. g. Cl, Br, I, $CH_3SO_4$ and $ClO_4$, may be manufactured from 2-methyl-cyclammonium salts.

From these 2-methyl-cyclammonium salts, 2-methylene bases are produced (A). The 2-methylene bases are caused to react with carbon sulphide (B) and the additive compounds are converted into esters by means of alkylating agents (C). The three steps A, B and C, are illustrated by the following examples: Herein the temperatures are stated in centigrade.

A. THE PREPARATION OF THE 2-METHYLENE BASES

Cyclammonium salts with a reactive methyl group in alpha position to the N-atom are treated by strong bases as for instance NaOH.

*Example 1.—2-methylene-3-methyl-beta-napthothiazoline*

16 g. of 2-methyl-beta-naphthothiazole dimethyl sulphate are dissolved in 200 cm.³ of ethyl alcohol. Next 8 g. of sodium hydroxide and 10 c. c. of water are added. After vigorously shaking until dissolution of the sodium hydroxide, about 7.6 g. of 2-methylene base are precipitated. Melting point is 147° C. (after thoroughly washing with water, alcohol and ether).

Reaction-scheme:

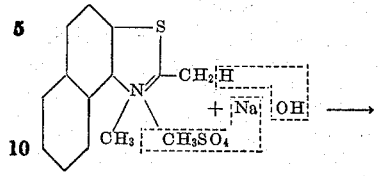

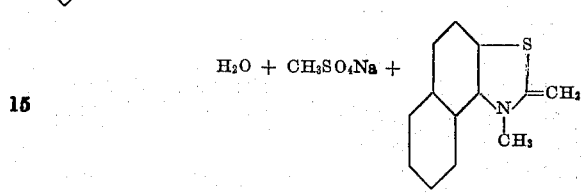

*Example 2.—2-methylene-3-6-dimethylbenzothiazoline*

12 g. of 2-6-dimethyl benzothiazole dimethyl sulphate are dissolved in 150 c. c. of acetone. The solution is treated with 6 g. of sodium hydroxide and 7 cm.³ of water. After separating and adding water to the acetone layer, 7 g. of methylene base are precipitated. Melting point is 168°.

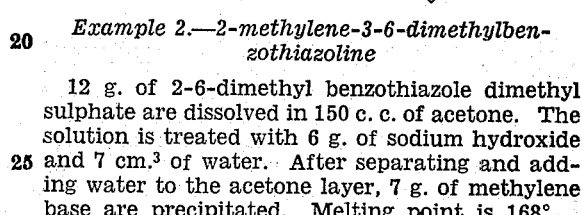

*Example 3.—1-ethyl-2-methylene-6-methoxyquinoline*

10 g. of 6-methoxy quinaldine ethyl bromide are dissolved in 10 c. c. of water. Next 40 c. c. of sodium hydroxide solution 2 N are introduced. The methylene base crystallizes out as brown powder. Melting point is 105°. Yield 4.3 g.

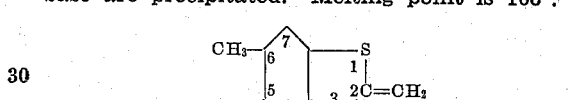

*Example 4.—2-methylene-3-ethyl benzothiazoline*

16 g. of 2-methyl benzothiazole di-ethyl sulphate are dissolved in 200 cm.³ of acetone. Next 8 g. of sodium hydroxide and 10 c. c. of water are added. Further treatment as for the 3-6-dimethyl base. Melting point is 136°. Yield 6 g.

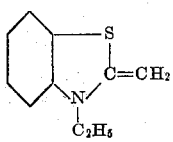

In the same way are obtained 2-methylene-3-benzyl - benzothiazoline (melting point at 143°)
2-methylene-3-methyl-alpha - naphthothiazoline (melting point at 180°)
2-methylene-3-methyl-6-chloro - benzothiazoline (melting point at 155°)
2 - methylene-3-methyl - 6 - methoxybenzothiazoline (melting point at 136°)
2 - methylene - 3 - 6 - dimethylbenzoselenazoline (melting point at 167°)
2-methylene-3-methyl - 6 - acetylaminobenzothiazoline (melting point at 105°)
2-methylene-3 - ethylbenzoselenazoline (melting point at 138°).

B. ADDITION OF CARBON SULPHIDE TO THE METHYLENE BASES

These 2-methylene bases form with carbon sulphide very characteristic additive compounds of the following probable formula:

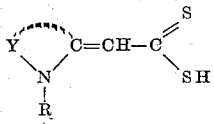

As examples of these additive compounds as well as of the process for their preparation may be cited:

*Example 5.—2-methylidene dithiocarboxylic acid of N-methyl-beta-naphthothiazol*

12 g. of 2-methylene-3-methyl-beta-naphthothiazoline are dissolved in 8 litres of anhydrous alcohol. Next 135 c. c. of carbon sulphide are added. After keeping 3 days at ordinary temperature a yellow powder is separated. Melting point 264° (after washing with boiling alcohol). The product is insoluble in the usual solvents. Yield 6.4 g.

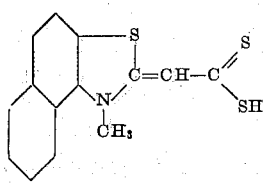

*Example 6.—2-methylidene dithiocarboxylic acid of 3-6-dimethyl benzothiazol*

47 g. of 2-methylene-3-6-dimethylbenzothiazoline are dissolved in 750 cm.³ of benzene. Next 21 c. c. of carbon sulphide are introduced. After two days a yellow deposit is obtained. Melting point 231° (after crystallisation from pyridine). Yield 11.5 g.

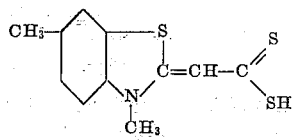

*Example 7.—2-methylidene dithiocarboxylic acid of 3-methylbenzoselenazol*

6 g. of 2-methylene-N-methylbenzoselenazoline are dissolved in 80 c. c. of ethyl alcohol and 25 c. c. of carbon sulphide are added. After two days 1.5 g. of additive compound is obtained. Melting point 237°.

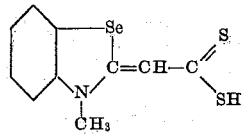

By proceeding in the same way are also obtained:

2-methylidene dithiocarboxylic acid of 3-benzylbenzothiazol (melting point 235°)
2-methylidene dithiocarboxylic acid of 3-methyl-alpha-naphthothiazol (melting point 275°)
2-methylidene dithiocarboxylic acid of 3-methyl-6-chloro-benzothiazol (melting point 288°)
2-methylidene dithiocarboxylic acid of 3-ethyl-6 - dimethylaminobenzothiazol (melting point 225°)
2-methylidene dithiocarboxylic acid of 3-methyl-6-dimethylaminobenzothiazol (melting point 240°)
2-methylidene dithiocarboxylic acid of 3-ethylbenzothiazol (melting point 232°)
2-methylidene dithiocarboxylic acid of 3-methyl-6-methoxybenzothiazol (melting point 239°)
2-methylidene dithiocarboxylic acid of 3-ethylbenzoselenazol (melting point 240°)
2-methylidene dithiocarboxylic acid of 3-methyl-5 - 6 - dimethoxybenzothiazol (melting point 245°)
2-methylidene-(alpha-methyl) - dithiocarboxylic acid of 3-methylbenzothiazol (melting point 226°)
2-methylidene-(alpha-methyl) - dithiocarboxylic acid of 3-methylbenzoselenazol (melting point 230°)
2-methylidene dithiocarboxylic acid of 3-6-dimethylbenzoselenazol (melting point 238°)
2-methylidene dithiocarboxylic acid of 3-methyl-6-thiomethylbenzothiazol (melting point 247°)
2-methylidene dithiocarboxylic acid of 3-ethyl-6-methoxyquinoline (melting point 204°)
2-methylidene dithiocarboxylic acid of 3-methyl-alpha-naphthoquinoline (melting point 200°)

C. PREPARATION OF THE ESTERS

From the additive compounds may finally be obtained, by addition of an alkyl ester or substituted alkyl ester, as for instance dimethyl sulphate, the desired intermediate substances of the following probable formula:

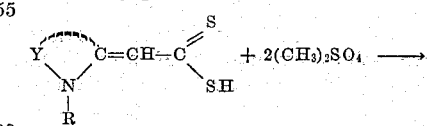

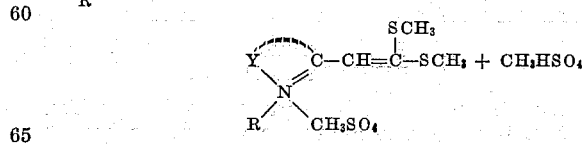

Other examples of such esters are: diethyl sulphate, ethyl-ester of para-toluene sulphonic acid, methyl ester of para-toluene sulphonic acid, benzyl ester of para-toluene sulphonic acid.

The reaction is further illustrated by the following examples:

*Example 8*

2.4 g. of N-methyl-2-methylidene benzothiazoline dithiocarboxylic acid are heated with 3.8 g. of dimethyl sulphate at 125–130° during two hours. By cooling, the liquid reaction mixture solidifies. On crystallizing from methyl alcohol, in which the non-alkylated acid is insoluble, an intermediate substance corresponding to the following formula

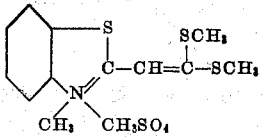

precipitates. Melting point 230°. Determination of S: 33.57%. Calculated amount 33.70%.

*Example 9*

2.9 g. of N-methyl-2-methylidene benzoselenazoline dithiocarboxylic acid are heated with 3.8 g. of dimethyl sulphate at 125° during two hours. After cooling, the mass, which has again solidified, is recrystallized from methyl alcohol and an intermediate substance of the probable formula.

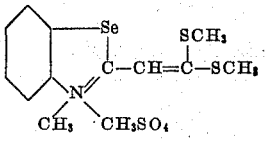

is obtained. Melting point 228°.

*Example 10*

10 g. of N-methyl-2-methylidene benzoselenazoline-dithiocarboxylic acid are heated with 20 c. c. of diethyl sulphate on a glycerol bath at 125° for three hours. After cooling, the mixture is washed with ether and dissolved in 125 c. c. of methyl alcohol. After filtration, 75 c. c. of a 20% potassium bromide solution are added. Freed by filtration from insoluble secondary products, the solution is treated with 200 cm.³ ether and cooled to 0°. An intermediate substance of the probable formula

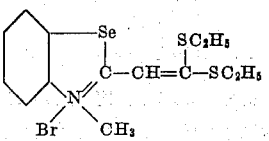

is obtained. Melting point 165°. Yield 6.5 g.

*Example 11*

10 g. of N-methyl-2-methylidene benzothiazoline dithiocarboxylic acid are heated with 20 c. c. of diethyl sulphate on a glycerol bath at 125–130° for two hours. After cooling, the mixture is dissolved in methyl alcohol and on addition of a solution of potassium iodide 10%, an intermediate substance of the probable formula.

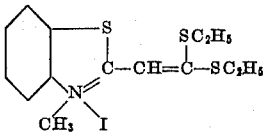

is obtained. The product is recrystallized from methyl alcohol. Melting point 178°.

*Example 12*

10 g. of N-methyl-2-methylidene-beta-naphthothiazoline dithiocarboxylic acid are heated with 30 c. c. of diethyl sulphate at 125° C. during five hours. After cooling, the solidified reaction mixture is dissolved in 75 c. c. of ethyl alcohol and precipitated with a solution of potassium bromide 10%. After twenty-four hours a dark colored half-solid deposit is formed. This is dissolved in alcohol, and ether is added to the cooled solution. Melting point 177°. The product corresponds probably with the formula:

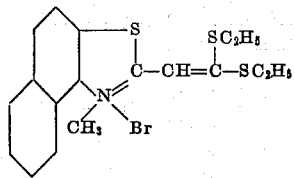

*Example 13*

20 g. of 3-6-dimethyl-2-methylidene benzothiazole dithiocarboxylic acid are heated with 40 c. c. of diethyl sulphate at 125° during two hours. After cooling, the mixture is washed with ether and dissolved in alcohol. This solution is treated with potassium iodide. After several hours, the deposit obtained is treated with alcohol and so freed from insoluble secondary products. The solution is treated with ether and an intermediate substance of the probable formula

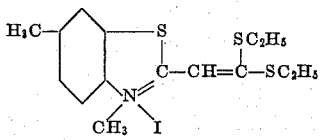

precipitates. The solution is crystallized from methyl alcohol. Melting point 197°. Yield 8 g.

*Example 14*

7 g. of 2-ethylidene - 3 - methylbenzothiazole dithiocarboxylic acid and 14 c. c. of diethyl sulphate are heated at 125° C. during 90 minutes. The product so obtained is washed with ether and dissolved in 50 cm.³ of methyl alcohol. A solution of potassium iodide 10% is added. After several hours, an intermediate substance of the probable formula

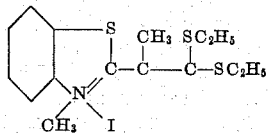

precipitates and it is recrystallized from alcohol. Melting point 179–185°. Yield 3.5 g.

From these products, symmetric and asymmetric sensitizing dyestuffs may be obtained as described in my co-pending application Ser. No. 754,605, filed June 13, 1947, now U. S. Patent No. 2,484,536, of which the present application is a division.

I claim:

1. A process of making a derivative of a cyclammonium salt of the formula

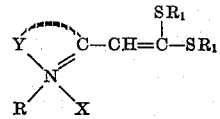

wherein Y represents the non-metallic atoms necessary for completing a member selected from the group consisting of 5- and 6-membered heterocyclic rings and 5- and 6-membered heterocyclic rings bearing a fused-on arylene group, R and R₁ both represent an alkyl group, and X represents an acid residue, which comprises effecting a condensation of a nitrogen-containing methylene base of the formula

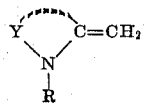

wherein Y and R have the same significance as above, with carbon sulphide, and converting such condensation product into an ester by treating same with an alkylating agent.

2. A process of making a dyestuff intermediate having the formula

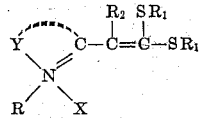

wherein Y represents the non-metallic atoms necessary for completing a member selected from the group consisting of 5- and 6-membered heterocyclic rings and 5- and 6-membered heterocyclic rings bearing a fused-on arylene nucleus, R and $R^1$ are alkyl, $R^2$ is a member selected from the group consisting of H and alkyl, X is an acid residue, which comprises condensing with carbon disulphide, in the presence of an alkali metal hydroxide, a compound of the formula

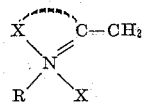

wherein R, X and Y have the same significance as above, and forming an ester by treating with an alkylating agent.

3. A process of producing a derivative of a cyclammonium salt having the formula

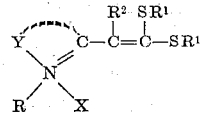

in which Y represents the non-metallic atoms necessary for completing a member selected from the group consisting of 5- and 6-membered heterocyclic rings and 5- and 6-membered heterocyclic rings bearing a fused-on arylene nucleus and R, $R^1$ and $R^2$ are alkyl and X is an acid residue, which comprises transforming the addition product of a cyclic nitrogen-containing alkylene base of the formula

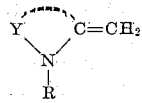

wherein X and R have the significance as given hereinabove, with carbon disulphide, into an ester by treating such addition product into an ester by treating same with an alkylating agent.

4. A dyestuff intermediate of the general formula:

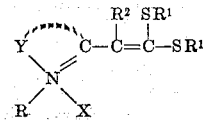

wherein Y = the non-metallic atoms required for completing a member selected from the group consisting of 5- and 6-membered heterocyclic rings and 5- and 6-membered heterocyclic ring systems having a fused-on arylene group, R, $R^1$ and $R^2$=alkyl and X=an acid residue.

5. 2-(beta-dimethyl mercapto vinyl)-benzoseleneazole dimethyl sulphate of the formula:

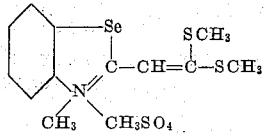

6. 2(beta-diethyl mercapto vinyl)-beta-naphthothiazole methyl halide of the formula:

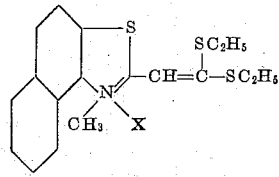

wherein X=a member selected from the group consisting of Br and I.

7. 2-(beta-dimethyl mercapto vinyl)-benzothiazole dimethyl sulphate of the formula:

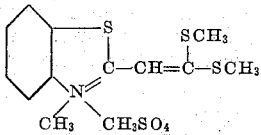

LEO ARNOLD VAN DE STRAETE.

REFERENCES CITED

The following references are of record in the file of this patent:

UNITED STATES PATENTS

| Number | Name | Date |
|---|---|---|
| 2,332,517 | Kendall et al. | Oct. 26, 1943 |
| 2,334,711 | Kendall et al. | Nov. 23, 1943 |